March 25, 1969  N. G. STÅLBERG  3,435,239
RADIATION ABSORPTION TESTER USING RC NETWORK TO
SIMULATE ABSORPTION FUNCTION
Filed Oct. 13, 1965

INVENTOR
NILS GUSTAF STÅLBERG
BY Hame and Nydick
ATTORNEYS

United States Patent Office 3,435,239
Patented Mar. 25, 1969

3,435,239
RADIATION ABSORPTION TESTER USING RC NETWORK TO SIMULATE ABSORPTION FUNCTION
Nils G. Stålberg, Jakobsberg, Sweden, assignor to L.K.B.-Produkter Aktiebolag, Stockholm, Sweden, a company of Sweden
Filed Oct. 13, 1965, Ser. No. 495,407
Claims priority, application Sweden, Oct. 17, 1964, 12,544/64
Int. Cl. G01n *21/26;* H01j *39/12;* G06g *7/48*
U.S. Cl. 250—218       14 Claims

ABSTRACT OF THE DISCLOSURE

There is disclosed a method of and an apparatus for measuring absorption of radiation passing through a test body containing radiation-absorbing material. The method and the apparatus are based on the utilization of the equation: $I=I_0.e^{-kc}$ where I is the intensity of the radiation passing through a test body; $I_0$ the intensity of the incident radiation; $k$ a known constant and $c$ the concentration of radiation-absorbing material to be measured. To measure the radiation-absorption, a first electric magnitude proportional to I and a second electrical magnitude proportional to $I_0$ are generated. Electric energy related to the second electric magnitude is accumulated in a reactive element and the reactive element is caused to discharge through a resistor. The value of the reactive element and/or the resistor are so selected that the time interval between the beginning of the discharge and the moment at which the amplitude of the energy stored in the reactive element decays to a value equal to the value of the electrical magnitude proportional to I, is directly proportional to the concentration $c$ of the radiation-absorbing material.

---

Figure 1:
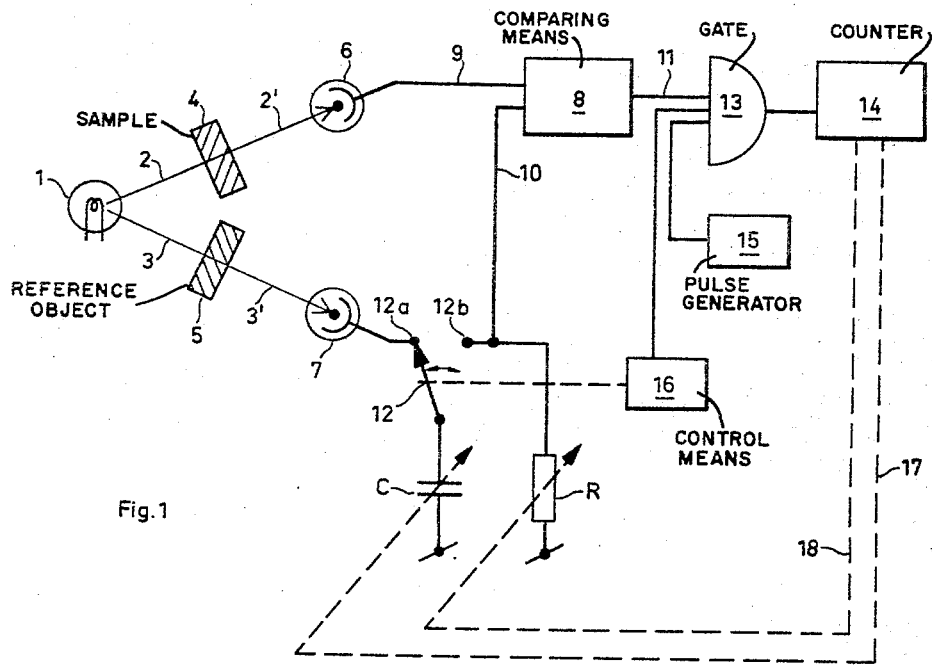

When making absorption measurements, using for example the method of photometric measurements, it is often of interest to determine the concentration of the matter which absorbs the light.

Different methods to determine this concentration are already known. It is for example known to arrange a transparent vessel containing the matter, usually a liquid the light absorption of which is to be determined, in the path of a beam of light from a light source. The light beam having passed through the matter is then arranged to strike a photocell or a similar photosensitive device that is arranged to provide an electric signal which is proportional to the intensity of the light beam in question.

In order to obtain a calibration or reference value one may proceed in either one of two different ways. Thus one may firstly measure an object of "known" value, a so-called "blank," or one may let a beam of light, preferably a beam emanating from the same source of light as the one that is used for the proper measurement, continuously generate a reference value by having the beam of light strike a reference photocell.

Various systems are also known which make use of one and the same photocell as the reference as well as the measuring photocell, using an optical system which either alternately guides the light beam through the sample or alternatively splits the beam into two components one of which passes through the sample while the other passes through the blank. In the latter case an aperture or the like is placed in front of the photocell in order to make the two rays alternately impinge on the photocell. The output signal from the photocell is divided timewise into two components one of which is proportional to the light that has passed through the sample while the other part is proportional to the radiation which has passed through the blank. It is also known to carry out simultaneous measurements on several samples or to carry out a plurality of sequential measurements on one and the same sample, for examples for kinetic measurements.

The method according to the invention, which may be applied to any of these prior known systems, will in the subsequent specification for the sake of simplicity be explained with reference to a system comprising one light source, one sample, one blank and two photocells.

An object of the present invention is to provide a method and an apparatus respectively for absorption measurements in a system comprising an incident beam of light which passes through a body and which leaves the body with reduced intensity due to absorption in the body. The absorption is such as to, at least within a certain interval, correspond to the relation $$I=I_0.e^{-kc}$$

where I designates the intensity of the radiation passing through the body, $I_0$ designates the intensity of the incident radiation, $k$ is a known constant and $c$ is the concentration of absorbing matter which is to be determined.

The relation stated above is called Beer's, Bouguer's or Lambert's law and the value to be determined, when measuring absorption, is the concentration, $c$, of absorbing material. The radiation leaving the blank is assumed to equal $I_0$.

The invention is based on the realisation that by generating a first electrical voltage or current proportional to I, and a second electrical voltage or current proportional to $I_0$, accumulating electrical energy in a reactive element of known magnitude corresponding to $I_0$, and then bringing the reactive element in question to discharge through a resistor of a known value, it is possible, by choosing a suitable value of the reactive and/or the resistive element, to make the time interval, starting at the beginning of the discharge and ending when the amplitude of the energy stored in the reactive element has reached a value equal to the value of the electrical quantity proportional to I, directly proportional to the concentration $c$ of the light absorbing material.

If for example a capacitor C, is used as the reactive element, and if the capacitor, after having been charged to a voltage $V_0$ proportional to the intensity $I_0$, is discharged through a resistor R, the time interval between the moment when the capacitor starts to discharge and the moment when the remaining voltage V has reached a value which, as described above, is proportional to I, will constitute a measure of the concentration $c$ of absorbing material.

That this is the case is easily seen by comparing the two functions $$V=V_0 \cdot \epsilon - \frac{t}{RC}$$

which expresses the voltage across the capacitor as a function of time, and $I=I_0 \cdot e^{-kc}$, which expresses the intensity of the emerging radiation as a function of the concentration $c$ of absorbing matter. Since $k$ is a known apparatus constant, one may choose the values of R and C in such a way that the time interval $t$ becomes a direct measure of the concentration $c$.

The present invention is directed to a method of measuring absorption in which the concentration, $c$, of absorbing matter is determined by the generating of a first electrical quantity which is proportional to the intensity of the incident radiation, accumulating electrical energy in a reactive electrical element to a level corresponding to a second electrical quantity, beginning at a defined first instant of time to discharge the energy stored in the reactive electrical element through a resistor of known value and comparing the instantaneous value of the stored and exponentially decreasing electrical energy with the value of the first electrical quantity, determining a second instant at which the value of the exponentially decreasing electrical energy equals the value of the first electrical quantity and from the length of time elapsed between the first and second instants of time directly determining the concentration $c$ of absorbing matter, said concentration being proportional to said amount of elapsed time.

The invention also resides in an apparatus for measuring absorption, especially the absorption of light, comprising a source of light which illuminates a sample as well as a blank, a first photocell provided in the path of the light beam passing through the sample in order to generate a first electrical quantity which is proportional to the intensity of the light having passed the sample, a second photocell provided in the path of the light beam having passed through the blank in order to generate a second electrical quantity which is proportional to the intensity of the light which has passed through the blank, a reactive electrical element arranged to be charged to a level corresponding to said second electrical quantity, a switch arranged to connect the reactive electrical element to a circuit containing a known resistive component at a certain instant of time, a comparing device arranged to compare the first electrical quantity with the exponentially decreasing level of the remaining charge of the reactive element and to generate a signal at that instant of time when the first electrical quantity and the decreasing level of charge have reached the same level, and means for the registration of a value which is proportional to the time interval between the first and said second instants of time and therefore also proportional to the concentration of absorbing matter in the sample.

Figure 2:
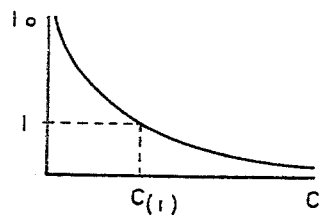
Figure 3:
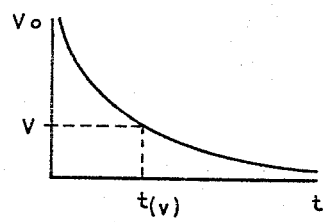

These and other objects of the invention will be further described with reference to the accompanying drawings of which FIGURE 1 schematically shows an apparatus according to the invention, FIGURE 2 shows a diagram of the intensity I as a function of the concentration $c$ and FIGURE 3 shows a diagram of the voltage V as a function of the time $t$.

FIGURE 1 shows, schematically, how the light from the source of light 1, in the form of two beams 2 and 3, strikes two measuring objects 4 and 5 respectively. It will be assumed that the measuring object 4 is the sample to be measured and comprises a body containing the light absorbing matter, the concentration of which is to be determined. The incident beam of light 2 passes through the sample 4 and emerges as a beam of light 2' with reduced intensity.

The beam of light 3 passes the measuring object 5 which in this case is assumed to be the reference object, i.e. the blank, and emerges likewise as a beam of light 3' with reduced intensity. The beams of light 2' and 3' respectively are directed upon two photocells, 6 and 7 respectively, and the photocells are arranged and constituted so as to generate a voltage V which is proportional to the intensity I of the incident light. The output voltage from the photocell 6, i.e. the sample photocell, which voltage is proportional to the intensity of the incident beam of light 2', is supplied to one of the two inputs of a comparing device 8, possibly after having been amplified. The comparing device 8 may consist of a differential amplifier having two inputs, 9 and 10, and one output 11, the latter arranged to provide a certain output voltage if one of the inputs, say the input 9, is supplied with a higher voltage than the other input in this case the input 10, but to provide a different output voltage when the opposite relation between the input voltages prevails.

The output from the photocell 7, i.e. the blank photocell may also be amplified and then supplied to one of the contacts 12a of a switch 12. A capacitor C is connected to the contact arm of the switch 12 and the other contact, 12b, of the switch is connected to the input 10 of the comparing device 8. This input is also connected in parallel with a resistor R. The output 11 is connected to one of the inputs of a gate 13. The gate 13 is further provided with a second input to which the output of a pulse generator 15 is connected. A counting and registrating device 14 is connected to the output of the gate 13. Gate 13, in the embodiment shown, is also provided with a third input arranged to be activated in dependence of the setting of a control device 16 which controls the switch 12.

FIGURE 2 shows how the intensity I of the beam of light 2', which falls on the photocell 6, is an inverse exponential function of the concentration $c$ of light absorbing matter in the sample 4.

The gate 13 may preferably be an AND-gate which, in the embodiment as here described, is such that the input of the gate which is connected to the output 11 of the comparing device 8, is activated when the voltage on the input 9 of the comparing device 8 is below the value of the voltage applied to the input 10. That input of the gate which is connected to the control device 16 operating the switch 12 is arranged to be activated when the switch 12 is connected to the contact 12b, i.e. when the capacitor C is connected to the input 10 of the comparing device 8. The capacitor is then discharged across the resistor R, the voltage across the capacitor decreasing exponentially with time as shown in FIGURE 3. The pulse generator 15 is arranged to generate pulses at a predetermined rate and those pulses which pass the gate 13 are counted and registered by means of the counting and registering apparatus 14.

The above outlined apparatus works as follows. The output from the photocell 6, i.e. from the sample photocell is, as already mentioned, supplied to one of the inputs of the comparing device 8 while the output from the photocell 7 is supplied to the capacitor C for a time interval of sufficent length to allow the capacitor to be charged to the potential $V_0$ after which the capacitor is connected to the input 10 of the comparing device 8 and at the same time being connected in parallel with the resistor R. When this switch-over has taken place, under control of the control device 16 the gate 13 is opened and the pulses from the pulse generator 15 are fed to the counting and registrating apparatus 14. As soon, however, as the voltage across the capacitor has decreased to a value equal to or less than the voltage from the photocell 6, the voltage or polarity on the output 11 of the comparing device 8 shifts causing the gate 13 to close. The connection between the pulse generator 15 and the counter 14 is broken and the number of pulses which have been accumulated in the counter will represent a direct measure of the time which has elapsed from the instant when the capacitor was connected in the discharge circuit to the instant when the voltage across the capacitor has decreased to a value corresponding to the voltage from the sample photocell 6.

It should be realised that the apparatus described above has been somewhat simplified in order to emphasize the more important aspects and that other modifications may be possible within the scope of invention. Thus, for example, the photocells 6 and 7 may be replaced by a single photocell in which case a rotating mirror or prism is placed between the source of light 1 and the measuring objects 4 and 5 respectively and/or between the measuring objects and the photocell in such a way that the beam 2' which has passed through the sample and the beam 3' which has passed through the blank alternately are brought to act on the photocell. Between the photocell and the contact 12a of the switch, switching means may be inserted which cause the capacitor first to be charged in dependence of the radiation which passes through the blank 5 and then to be discharged in a previous described manner, while the photocell produces a voltage in dependence of the radiation which passes through the sample 4 and which is fed to the input 9 of the comparing device 8.

Since photocells as a rule only are able to carry a limited load it may prove necessary to provide amplification between the photocell and the capacitor in order to speed up the charging of the latter. The amplification may preferably be of feed-back current type with a unity voltage gain.

In a simplified embodiment, the comparison device 8 may take the form of an ordinary differential relay or the like. If the requirements regarding precision can be lowered somewhat, the pulse generator 15 and the counter 14 may be replaced by an electrical or mechanical clockwork, the starting and stopping of which is directly controlled from the gate 13. If, on the other hand the requirements with respect to precision are greater, the pulse generator 15 preferably may be crystal controlled with a sufficient high frequency to provide a fine enough time division.

The switch 12 may be arranged to be effected from the control device 16 in such a way, that the measuring automatically is repeated a number of times in which case the device 14 for example may include a data printer or punch for registering the possibly different results of the plurality of measurements in a form which is suitable for statistical evaluation.

A device according to the invention may further be provided with means for automatic scale expansion. In order to accomplish this the values of resistor R, capacitor C or the pulse repeating frequency may be varied by means of control signals from the counter 14, as indicated by lines 17 and 13 in FIGURE 1.

The arrangement may preferably be such that the first measurement always is carried out with that RC combination which gives the shortest time constant. The number of pulses counted during the time interval mentioned before is used to determine whether or not the measurement is to be repeated with a larger time constant. The control signal in the counter may preferably be derived from the carry signal to a predetermined test digit, for example the highest but one digit in such a way, that if no carry to this digit position has taken place during the measurement this automatically causes the registration of the value obtained to be inhibited and the measuring to be repeated with a greater, for example ten times greater R or C or a ten times higher pulse repeating frequency of the pulse generator. This latter described arrangement, which of course may be modified in different ways, ensures a satisfactory numerical accuracy of the registered value.

What I claim is:

1. A method for measuring absorption in a system of the kind where incident radiation when passing through a body including radiation-absorbing material is partially absorbed by the body and the relation between the incident radiation and the radiation emerging from the body is expressed by the relation $I=I_0 \cdot e^{-kc}$, where I designates the intensity of the radiation which emerges from the body, $I_0$ designates the intensity of the incident radiation, $k$ is a constant and $c$ is the concentration of absorbing material, comprising the steps of generating incident radiation, directing the incident radiation through the body of radiation-absorbing material, generating a first electrical signal which is proportional to the intensity of the radiation emerging from the body, generating a second electrical signal which is proportional to the incident radiation, accumulating electrical energy in a reactive electrical element to a value corresponding to the second electrical signal, at a first instant of time exponentially discharging the accumulated electrical energy stored in said reactive electrical element through a resistor of predetermined value to generate an exponentially decaying electrical signal, comparing the value of said exponentially decaying electrical signal with the value of said first electrical signal, and indicating a second instant of time at which the value of said exponentially decaying electrical signal equals the value of said first electrical signal, whereby the time interval between said first and second instants of time is proportional to the concentration of absorbing material.

2. The method of claim 1, wherein the generating of the second electrical signal which is proportional to the incident radiation includes passing the generated incident radiation through a body of known absorption properties.

3. Apparatus for measuring the absorption of radiation passing through a test body containing radiation-absorbing material, wherein the relation between the radiation entering the test body and the radiation emerging from the test body is an exponentially decaying function of the concentration of the absorbing material, said apparatus comprising means for generating the radiation, means for directing the generated radiation through the test body, means for generating a first electrical signal related to the intensity of the radiation emerging from the test body and a second electrical signal related to the generated radiation, reactive means for accumulating an electrical quantity related to said second electrical signal, resistive means for discharging said reactive means starting at a given instant of time to generate an exponentially decaying electrical signal, means for magnitude comparing said first electrical signal and said exponentially decaying electrical signal to indicate when said signals are equal, and timing means activatable at said given instant of time and responsive to said magnitude comparing means to indicate the time interval between said given instant of time and the instant of time when said magnitude comparing means indicates equality.

4. The apparatus of claim 3, wherein the means for generating the radiation is a light source.

5. The apparatus of claim 3, wherein the means for generating the first and second electrical signals include photosensitive means.

6. The apparatus of claim 3, wherein the means for generating the first and second electrical signals include a blank body and means for directing the generated radiation through said blank body so that the radiation emerging therefrom is utilized in the generation of said second electrical signal.

7. The apparatus of claim 3, wherein the means for generating the first and second electrical signals include a first photosensitive means for receiving the radiation emerging from the test body to generate said first electrical signal, a blank body, means for directing the generated radiation through said blank body, and second photosensitive means for receiving the radiation emerging from said blank body to generate said second electrical signal.

8. The apparatus of claim 3, wherein said reactive means is a capacitor.

9. The apparatus of claim 3, wherein said timing means includes a pulse-counting means which is activated at said given instant of time and is deactivated at the instant of time when said equality comparing means indicates an equality.

10. The apparatus of claim 3, wherein said resistive means include a resistor and switching means for connecting said resistor to said reactive means and for generating a signal when the connection is made, and said timing means includes a pulse-counting means which is activated by the signal generated by said switching means and is deactivated at the instant of time when said equality comparing means indicates an equality.

11. The apparatus of claim 10, wherein said magnitude comparing means generates a signal to indicate the equality and wherein said pulse-counting means includes a source of pulses, a pulse counter and gating means interposed between said source of pulses and said pulse counter, said gating means including a first control input for receiving the signal generated by said switching means to permit the passage of pulses from said source of pulses to said pulse counter and a second control input for receiving the signal generated by said magnitude comparing means to prevent the passage of pulses from said source of pulses to said pulse counter.

12. The apparatus of claim 11, wherein said magnitude comparing means is a voltage-controlled differential amplifier.

13. The apparatus of claim 3 and further comprising means for changing the time constant of said reactive and resistive means.

14. The apparatus of claim 11 and further comprising means for varying the pulse repetition frequency of said source of pulses.

References Cited
UNITED STATES PATENTS

| | | | |
|---|---|---|---|
| 2,668,284 | 2/1954 | Mapes | 250—218 |
| 3,109,930 | 11/1963 | MacDonald | 235—184 |

RALPH G. NILSON, *Primary Examiner.*

MARTIN ABRAMSON, *Assistant Examiner.*

U.S. Cl. X.R.

235—184; 250—219, 209, 220